Patented Mar. 7, 1950

2,500,045

UNITED STATES PATENT OFFICE 2,500,045

DIANIL DYE PHOTOGRAPHIC FILTER LAYER

George W. Sawdey, Rochester, N. Y., assignor to Eastman Kodak Company, Rochester, N. Y., a corporation of New Jersey Application May 29, 1948, Serial No. 30,008

9 Claims. (Cl. 95—8)

This invention relates to filter layers for photographic elements and more particularly to filter layers containing a dianil dye as the light-absorbing medium.

Azo methine dyes obtained by condensing a monoaldehyde with an aliphatic or aromatic amine are well known and have been described for use in light-filtering layers. Such dyes are unstable and are bleachable, particularly in solutions containing bisulfite such as photographic developing and fixing baths.

I have found that the previously described azomethine dyes have the disadvantage that they either are not quickly decomposed or bleached in photographic solutions, or, if readily decolorized, are not readily removable from photographic elements containing them. The result is that after processing the element, particularly a color film, the residue appears as an objectionable stain or the dye residue has a deleterious effect on the quality or stability of the photographic image.

I have unexpectedly discovered that if I utilize in filter layers in photographic elements, dyes containing two azomethine linkages (dianil dyes), the rate of bleaching or decomposition is much greater than in the case of the simple azomethine dyes. Moreover, the decomposed dyes are readily removable during the processing of the photographic element.

One object of my invention is to provide azomethine dyes having superior properties as filter dyes. Another object is to provide methods of producing said dyes. A further object is to provide photographic elements containing dianil dye filter layers. Other objects will become apparent from the following description of my invention.

The objects of my invention are accomplished in part by reacting a dialdehyde with a phenylene diamine and incorporating the resulting dianil dye in filter layers of photographic elements.

The dianil dyes of my invention have the following general formula:

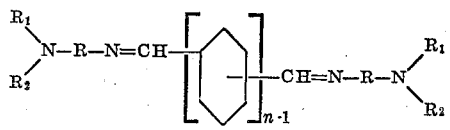

where $n$ is a positive integer from 1 to 2, R is a p-phenylene group, $R_1$ and $R_2$ each represents a member selected from the group consisting of hydrogen and alkyl.

Depending upon whether an aliphatic or aromatic dialdehyde reactant is used, e. g. glyoxal or o, m, or p-phthalaldehydes, the dyes have the general formulas:

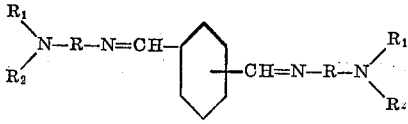

or

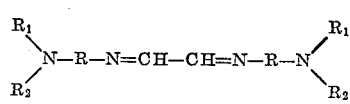

where R is a p-phenylene group, $R_1$ and $R_2$ each represents a member selected from the group consisting of hydrogen and alkyl.

Figure 1:
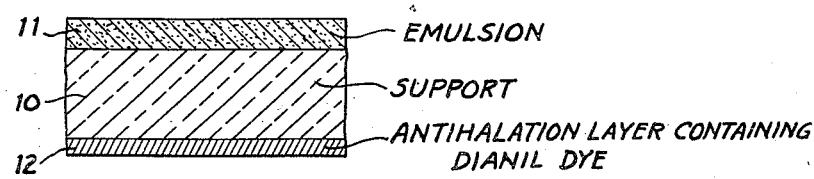
Figure 2:
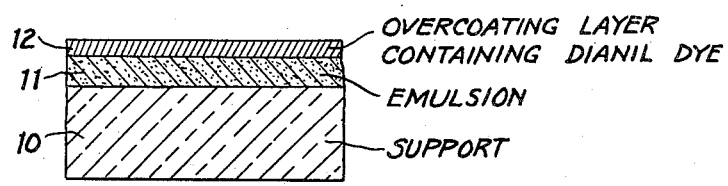
Figure 3:
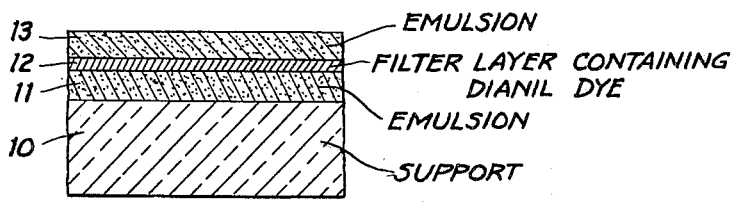
Figure 4:
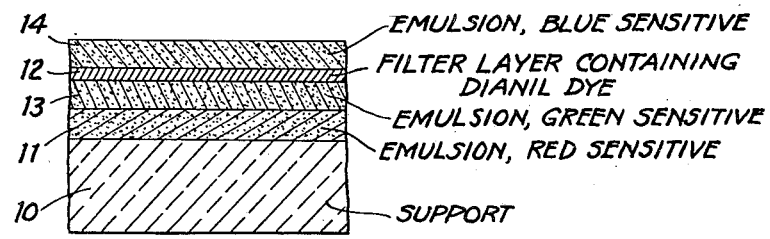

In the accompanying drawings are shown in enlarged cross-sectional view the appearance of various photographic elements, comprising a part of my invention, with filter layers containing the dianil dyes, according to which Fig. 1 shows an element containing the dye in an antihalation layer; Fig. 2, the dye in an overcoating layer; Fig. 3, the dye in an intermediate layer of a two-emulsion layer film; and Fig. 4, the dye in an intermediate layer of a three-emulsion layer film. In the drawings 10 is a support such as cellulose acetate, glass, paper, and the like, coated with one or more light-sensitive silver halide emulsion layers 11, 13 and 14, and provided on either side as an antihalation or overcoating layer, or between the emulsion layers with layer 12 containing a dianil dye.

Specific dianil dyes which have the mentioned superior properties are, for example, those obtained by reacting glyoxal or o, m, or p-phthalaldehydes with phenylene diamines such as the following:

(1) 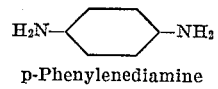

p-Phenylenediamine (2) 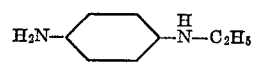

Ethyl-p-phenylenediamine (3) 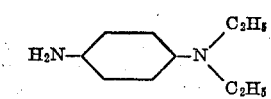

p-Amino diethylaniline (4) 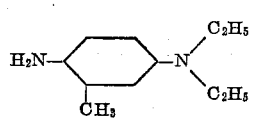

2-amino-5-diethylaminotoluene (5)

4-amino-N-ethyl-N-(β-methanesulfonamido ethyl) aniline (6)

4-amino-N-ethyl-N(β-methane sulfonamidoethyl) m-toluidine (7)

3-ethoxy-4-amino-N-ethyl-N-β-methane sulfonamidoethyl-aniline (8)

4-amino-N-ethyl-N(β-ethoxy ethyl)m-toluidine (9)

3-β-methanesulfonamidoethyl-4-amino-N-N-diethylaniline (10)

3-methanesulfonamido-4-amino-N-N-dimethylaniline (11)

4-amino-N-ethyl-N(N'-methyl-N'-β-methyl-sulfonamido-ethyl)aniline (12)

4-amino-3 (N'-methyl-N'-β-methyl sulfonamido ethyl)-N,N-diethyl aniline (13)

3-ethoxy-4-amino-N-ethyl-N-β-acetamidoethylaniline

The glyoxylidene or phthalylidene compounds are prepared as described in the following example.

*Glyoxylidene-bis-(2-methyl - 4 - diethylamino aniline)*—In a container provided with a stirrer is placed a solution of 2.15 gm. (.01 mol) of 2-amino-5-diethylaminotoluene hydrochloride in 50 cc. water and 1 cc. (about .005 mol) of a 35% aqueous glyoxal solution. With vigorous stirring, 4 cc. of 10% sodium hydroxide solution is added dropwise. The reddish-brown precipitate is filtered off and recrystallized from ethyl alcohol. The resultant orange crystals have a melting point of 156–157° C. Other glyoxylidene or phthalylidene (dianil) dyes are prepared in a similar manner by condensing diamines like Nos. 1–13 above with the appropriate dialdehyde, with the exception that when p-phenylene diamine is selected as a reactant, I find it advisable in order to avoid tarry products, to carry out the condensation through p-amino-acetanilide followed by alkaline hydrolysis of the acetyl group.

The dianil compounds prepared as above described, are incorporated in filter layers by mixing the compound with a vehicle such as gelatin by use of an oily solvent, for example, a filter layer may be coated from a composition made as follows: One gram of glyoxylidene-bis-(2-methyl-4-diethyl aniline) dissolved in 4 cc. of butyl phthalate at 145° C. is combined with 20 cc. of 10% aqueous gelatin solution, 2 cc. of a 10% solution of triisopropyl naphthalene sulfonate and 2 cc. of water. The mixture is homogenized by passing it through a colloid mill and the resulting dispersion then mixed with 50 cc. of 2% gelatin solution and finally coated on a support or over an emulsion layer according to the desired modification of my invention shown in the accompanying drawings.

Other dianil dyes, prepared as above described, will obviously occur to those skilled in the art, however. There are certain limitations to the useful compounds employed as bleach filter dyes. I find that the dyes most readily bleachable and removable from filter layers are obtained from p-phenylene diamine intermediates, such as compounds Nos. 1–13. This behavior is apparently attributable to the presence of a conjugated system in the diamine molecule. Other p-diamines useful for obtaining the dianil dyes are disclosed in Weissberger U. S. Patent 2,193,015, March 12, 1940; Dickey et al. U. S. Patent 2,241,769, May 13, 1941; Weissberger U. S. Patent applications Serial Nos. 13,525 and 13,526, filed March 6, 1948, No. 750,178, filed May 23, 1947, No. 731,420, filed February 27, 1947, and Weissberger application Serial No. 759,302, filed July 5, 1947, now Patent No. 2,449,919, September 21, 1948. Also, when there is a substituent in the nucleus of the amine as alkyl, alkoxy, hydroxyl, etc., it should be ortho to the primary amino group, otherwise the desired bleaching properties are not obtained. Similarly, when phthalylidene dianil dyes are used, I prefer those obtained by treating the ortho and para phthalaldehydes with the diamines. Dianil dyes forming the preferred embodiments of my invention are made from the simpler diamines such as diamines Nos. 1–4, and 10. The methyl, propyl, and butyl homologs of No. 4 are also very useful. These diamines provide dyes which bleach most readily and are most soluble in photographic processing solutions, particularly bisulfite solutions.

Herein and in the appended claims wherein I refer to "alkyl" groups, this includes lower alkyl groups of about 1–4 carbon atoms, as well as alkyl groups substituted as above described and including hydroxyl-substituted alkyl groups. Similarly by "alkoxyl" I mean to include preferably 1–4 carbon atoms in the carbon chain as well as substituted alkoxyl groups of the type described above. By "phenylene" I also include the mentioned ortho-substituted nuclei where the substituent is alkyl, alkoxyl, and the like.

The dianil dyes of my invention may be dispersed in colloidal materials other than gelatin such as polyvinyl alcohol, partially hydrolyzed cellulose acetate and cellulose acetate-lower aliphatic esters, e. g. propionate or butyrate, hydrophilic cellulose ethers as ethyl and methyl cellulose and their partially etherified derivatives, partially hydrolyzed polyvinyl acetates, acid and alkali soluble cellulose esters, and natural colloids as gum arabic or Irish Sea Moss.

It is apparent from the foregoing description of the properties of the dyes of my invention, that when the dyes are incorporated in photographic elements such as shown in the drawings, the dyes are readily removable in processing solutions containing bisulfite, such as fixing baths. The filter layers serve in the usual manner to prevent certain wave lengths of light from reaching an emulsion layer, usually the shorter wave lengths such as blue light being absorbed, since the dyes are yellowish colored. Accordingly, the filter layer is located in the photographic element in a position relative to one or more of the emulsion layers such that the desired filter effect is obtained. The emulsion layers of the elements shown in the drawings may contain the usual sensitive silver halide, and if desired, coupler compounds of well-known types such as cyan, magenta and yellow couplers. Films of these types are well known and are ordinarily sensitized complementary to the color of the image to be developed in the emulsion layer by means of color-development methods.

It will be understood that the examples and modifications disclosed herein are illustrative only, and that my invention is to be taken as limited only by the scope of the appended claims.

What I claim is:

1. A photographic element provided with a light-sensitive silver halide emulsion layer and a filter layer located to absorb a portion of light reaching said emulsion layer, said filter layer comprising a layer of water-permeable organic colloid containing a compound having the general formula:

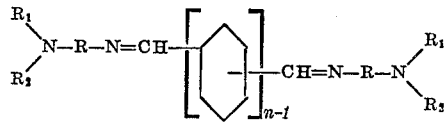

where $n$ is a positive integer from 1 to 2, R is a p-phenylene group, $R_1$ and $R_2$ each represents a member selected from the group consisting of hydrogen and alkyl.

2. A photographic element provided with a light-sensitive silver halide emulsion layer and a filter layer located to absorb a portion of light reaching said emulsion layer, said filter layer comprising a layer of water-permeable organic colloid containing a compound having the general formula:

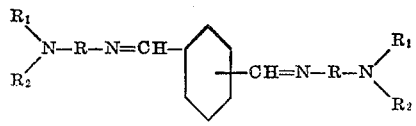

where R is a p-phenylene group, $R_1$ and $R_2$ each represents a member selected from the group consisting of hydrogen and alkyl.

3. A photographic element provided with a light-sensitive silver halide emulsion layer and a filter layer located to absorb a portion of light reaching said emulsion layer, said filter layer comprising a layer of water-permeable organic colloid containing a compound having the general formula:

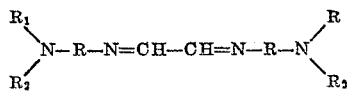

where R is a p-phenylene group, $R_1$ and $R_2$ each represents a member selected from the group consisting of hydrogen and alkyl.

4. A photographic element provided with a light-sensitive silver halide emulsion layer and a filter layer located to absorb a portion of light reaching said emulsion layer, said filter layer comprising a layer of water-permeable organic colloid containing a compound having the general formula:

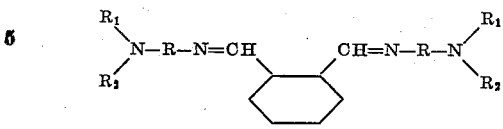

where R is a p-phenylene group, $R_1$ and $R_2$ each represents a member selected from the group consisting of hydrogen and alkyl.

5. A photographic element provided with a light sensitive silver halide emulsion layer and a filter layer located to absorb a portion of light reaching said emulsion layer, said filter layer comprising a layer of water-permeable organic colloid containing a compound having the general formula:

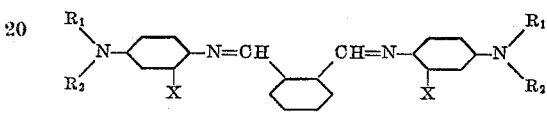

where $R_1$ and $R_2$ each represents a member selected from the group consisting of hydrogen and alkyl, X is a member selected from the group consisting of alkyl, alkoxyl, and alkylacylamido.

6. A photographic element provided with a light-sensitive silver halide emulsion layer and a filter layer located to absorb a portion of light reaching said emulsion layer, said filter layer comprising a layer of water-permeable organic colloid containing a compound having the general formula:

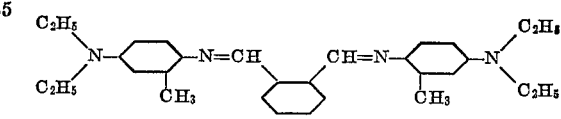

7. A photographic element provided with a light-sensitive silver halide emulsion layer and a filter layer located to absorb a portion of light reaching said emulsion layer, said filter layer comprising a layer of water-permeable organic colloid containing a compound having the general formula:

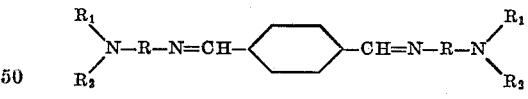

where R is a p-phenylene group, $R_1$ and $R_2$ each represents a member selected from the group consisting of hydrogen and alkyl.

8. A photographic element provided with a light-sensitive silver halide emulsion layer and a filter layer located to absorb a portion of light reaching said emulsion layer, said filter layer comprising a layer of water-permeable organic colloid containing a compound having the general formula:

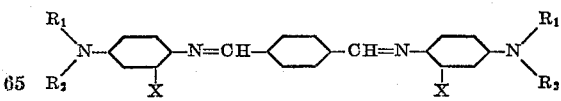

where $R_1$ and $R_2$ each represents a member selected from the group consisting of hydrogen and alkyl, X is a member selected from the group consisting of alkyl, alkoxyl and alkylacylamido.

9. A photographic element provided with a light-sensitive silver halide emulsion layer and a filter layer located to absorb a portion of light reaching said emulsion layer, said filter layer comprising a layer of water-permeable organic colloid containing a compound having the general formula:
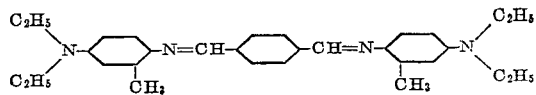
GEORGE W. SAWDEY.
REFERENCES CITED
The following references are of record in the file of this patent:
UNITED STATES PATENTS
| Number | Name | Date |
|---|---|---|
| 2,298,733 | Brooker et al. | Oct. 13, 1942 |
| 2,393,027 | Duerr et al. | Jan. 15, 1946 |